J. B. HARPER.
TRUCK.
APPLICATION FILED MAR. 6, 1914.
1,126,457.  Patented Jan. 26, 1915.
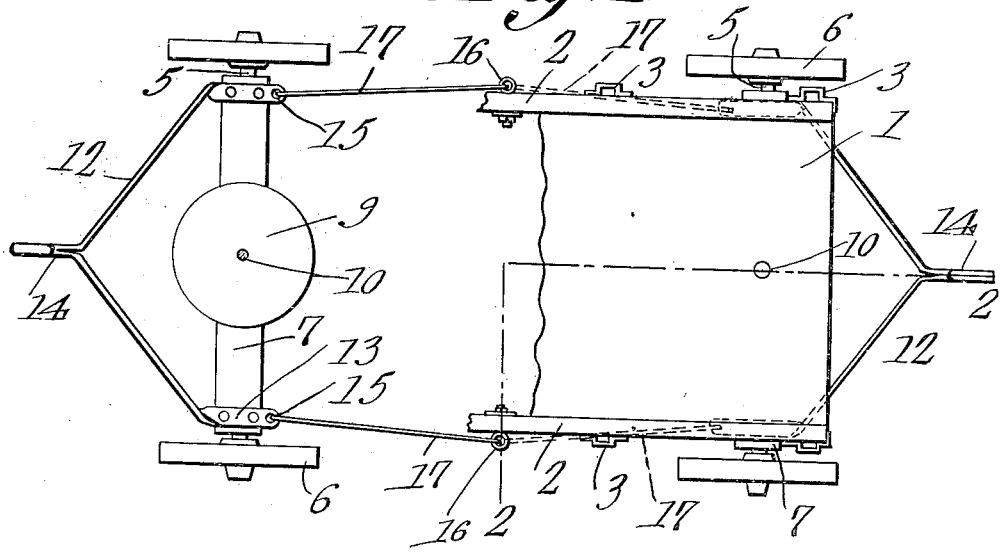
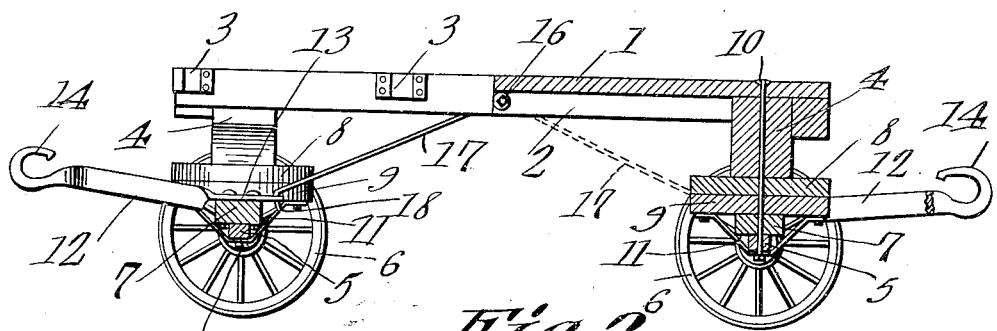

UNITED STATES PATENT OFFICE.

JESSE B. HARPER, OF TIMMONSVILLE, SOUTH CAROLINA.

TRUCK.

1,126,457.  Specification of Letters Patent. Patented Jan. 26, 1915.

Application filed March 6, 1914. Serial No. 822,943.

*To all whom it may concern:*

Be it known that I, JESSE B. HARPER, a citizen of the United States, residing at Timmonsville, in the county of Florence and State of South Carolina, have invented a new and useful Truck, of which the following is a specification.

The present invention appertains to trucks, and aims to provide a novel and improved reversible truck, adapted to be drawn in either direction.

As a more specific object, the present invention contemplates the provision of a truck embodying pivoted axles, and unique means for locking one or the other of the axles rigidly in position, while the other axle is free to oscillate for turning or steering the truck.

It is also within the scope of the present invention to provide a truck of the nature indicated, which is peculiarly adapted for use in tobacco growing districts, for conveying the tobacco, although it is to be understood that the truck can be employed in divers capacities.

The present invention also aims for the production of a reversible truck embodying a unique assemblage of the component parts, whereby the truck will be comparatively simple, substantial, unencumbered and inexpensive in construction, as well as being simple, convenient, practical, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a plan view of the improved truck, portions being broken away. Fig. 2 is a longitudinal section of the truck, taken on the line 2—2 of Fig. 1.

In carrying out the present invention, the truck preferably embodies a flat body or frame 1, in the form of a platform, and having the side sills or beams 2, which depend below the bottom of the body or frame 1.

Suitable stake sockets 3 are preferably secured to the outer sides of the sills 2, whereby suitable stakes or chocks may be applied to the sides of the body or platform 1, for retaining the load in place. Secured to the bottom of the body or frame 1, adjacent the ends thereof, are suitable body bolsters 4, which are disposed transversely of the body or frame between the sills or beams 2.

A pair of axles 5 are provided, each having the ground wheels 6 journaled to the ends thereof, and sand bolsters 7 are secured in any suitable manner upon the axles 5. Each of the axles 5 and its sand bolster 7, are pivotally connected to one of the body bolsters 4, through the medium of a fifth wheel, which comprises upper and lower fifth wheel plates 8 and 9, respectively. The upper plates 8 are secured to the bottoms of the body bolsters 4, while the lower plates 9 are secured upon the sand bolsters 7, the plates 8 and 9 of the two fifth wheels contacting, and having smooth or anti-frictional bearing surfaces therebetween. King bolts 10 are engaged through the fifth wheel plates of each pair, and the king bolts also preferably extend through the body and sand bolsters, as well as the axles and body or platform 1.

It is preferable to employ V-shaped braces or brackets 11 having their crotch portions engaging the lower ends of the king bolts 10, and having their terminals secured to the front and rear portions of the lower fifth wheel plates 9, to brace the fifth wheel structures, as will be obvious.

A V-shaped draft member 12 is provided for each of the axles 5, the same having its terminal portions twisted, bent angularly, and riveted or otherwise secured upon the end portions of the corresponding sand bolster 7, as at 13. The crotch portions of the draft members or forks 12, are provided with hooks or coupling means 14, for enabling the truck to be drawn manually, or to permit draft animals to be hitched to either end of the truck.

The end portions 13 of the draft members 12, project inwardly beyond the sand bolsters 7, and are provided with apertures or sockets 15.

In order to lock or brace either of the axles in a stationary or rigid position, a pair of eye bolts or bearing members 16 are swiveled through the sills 2 of the body or frame 1, midway between the ends of the body, the eyes of the bolts 16 being disposed outermost. A pair of braces or hounds 17 are loosely engaged to the eyes of the bolts 16, and are provided at their free ends with hooks or angular bills 18, which are engageable through the apertures or sockets 15 of the respective axles, when the braces or hounds are swung to the opposite ends of the truck.

It is evident that when the braces or hounds 17 are disengaged from both of the axles, the axles will be free to oscillate or swing relative to the body, although, ordinarily, one or the other of the axles is locked in its neutral or transverse position, while the other axle is free. To accomplish this result, the braces or hounds 17 are swung toward one of the axles, and their free ends are engaged to the said axle, as above intimated, which will securely brace the said axle against swinging movements. The other axle will be free to be angled for steering or turning the truck, and it is to this axle, that the draft is applied for drawing the truck, either manually or by means of draft animals. The hooks 14 of the draft members 12 serve as convenient and efficient means for pulling either end of the truck, according to which of the axles is locked stationary.

It is an easy matter to release the locked axle, and to lock the other axle, by simply swinging the braces 17 upwardly whereby the hooks 18 thereof disengage the apertured or socketed portions 15 of the corresponding axle, the eye bolts 16 being swiveled, to enable the braces 17 to be swung upwardly and toward the other end of the truck, and to be engageable with the corresponding axle in the manner above described.

The present truck is adapted particularly for use in tobacco districts, for handling tobacco, although the truck may be employed for numerous other purposes, as will be evident without further comment. It is evident that the present truck eliminates the necessity of turning the truck around, when the same is to be reversed, it merely being necessary to properly engage the braces or hounds 17 to the proper axle.

From the foregoing, taken in connection with the drawing, the salient features and capabilities of the present invention will be obvious to those versed in the art, it being noted that the objects aimed at have been carried out satisfactorily by the provision of the structure herein disclosed.

Having described the invention, what is claimed as new is:—

1. In a truck, a body, a pair of pivoted axles for the ends thereof, and a brace loosely connected to the body midway between the axles and adapted to be swung toward both ends of the body, the free end of the brace and the axles having interengageable means.

2. In a truck, a body, a pair of pivoted axles for the ends thereof, and braces loosely connected to the sides of the body midway between the axles and adapted to be swung toward both ends of the body, the free ends of the braces and the axles having interengageable means.

3. In a truck, a body, a pair of pivoted axles for the ends thereof, a bearing swiveled to the body midway between the axles, and a brace loosely connected to the bearing and adapted to be swung toward both ends of the body and having means at its free end to engage either axle.

4. In a truck, a body, a pair of pivoted axles for the ends thereof, a pair of eye bolts swiveled to the sides of the body midway between the axles, and braces connected loosely to the eye bolts the braces being adapted to be swung toward both ends of the body and having means at their free ends for engaging either axle.

5. In a truck, a body, a pair of pivoted axles for the ends thereof, socketed members carried by the end portions of each axle, and braces loosely connected to the sides of the body midway between the axles and adapted to be swung toward both ends of the body, the free ends of the braces having hooks engageable with the socketed members of either axle.

6. In a truck, a body, a pair of pivoted axles for the ends thereof, a pair of V-shaped draft members having their end portions secured to the axles, and braces pivoted to the sides of the body midway between the axles and adapted to be swung toward both ends of the body, the free ends of the braces and the end portions of the draft members having interengageable portions.

In testimony that I claim the foregoing as my own, I have hereto affixed my signature in the presence of two witnesses.

JESSE B. HARPER.

Witnesses:
 SELINA WILLSON,
 I. E. SIMPSON.

Copies of this patent may be obtained for five cents each, by addressing the "Commissioner of Patents, Washington, D. C."